United States Patent [19]

Kamel et al.

[11] Patent Number: 4,688,092
[45] Date of Patent: Aug. 18, 1987

[54] SATELLITE CAMERA IMAGE NAVIGATION

[75] Inventors: Ahmed A. Kamel, Sunnyvale; Donald W. Graul, San Mateo; John Savides, Los Altos Hills; Charles W. Hanson, Mountain View, all of Calif.

[73] Assignee: Ford Aerospace & Communications Corporation, Detroit, Mich.

[21] Appl. No.: 860,142

[22] Filed: May 6, 1986

[51] Int. Cl.$^4$ .............................................. H06N 7/01
[52] U.S. Cl. ........................... 358/109; 33/320;
358/103; 358/107; 358/140; 358/160; 382/45
[58] Field of Search ............... 358/109, 103, 107, 140, 358/160, 180; 370/104; 382/45; 33/320

[56] References Cited

U.S. PATENT DOCUMENTS

| | | | |
|---|---|---|---|
| 3,223,777 | 12/1965 | Crawford et al. | 358/109 |
| 3,676,581 | 7/1972 | Swet | 358/109 |
| 3,716,669 | 2/1973 | Watanabe | 358/109 |
| 3,769,710 | 11/1973 | Reister | 33/320 |
| 3,859,460 | 1/1975 | Westell | 358/125 |
| 3,952,151 | 4/1976 | Jenkin | 358/109 |
| 4,012,018 | 3/1977 | Lorell et al. | 244/165 |
| 4,300,159 | 11/1981 | Hummer et al. | 358/109 |
| 4,439,788 | 3/1984 | Frame | 358/109 |
| 4,593,317 | 6/1986 | Heydlauff | 358/140 |
| 4,602,375 | 7/1986 | Inukai | 370/104 |
| 4,630,111 | 12/1986 | Blain | 358/160 |
| 4,639,774 | 1/1987 | Fried | 358/109 |

OTHER PUBLICATIONS

D. W. Graul, Oral Presentation Accompanied by a Posterboard Display Before the Environmental Research Institute of Michigan at its International Symposium on Remote Sensing of the Environment, Oct. 21, 1985.

"New GOES to Sharpen Severe Weather Tracking", Aviation Week and Space Technology, Dec. 23, 1985.
A. Schwalb, "Envirosat-2000 Report; GOES-Next Overview", National Oceanic and Atmospheric Administration, Sep. 1985, pp. 25, 26, 28, 32, 35, 36.
P. D. Landecker, "Operational Spacecraft Attitude Determination Using Data from a Spinning Sensor", Journal of Astronautical Sciences, vol. 32, No. 2, Apr.-Jun. 1984, pp. 189-198.

*Primary Examiner*—Howard W. Britton
*Attorney, Agent, or Firm*—Edward J. Radlo; Keith L. Zerschling

[57] ABSTRACT

Pixels within a satellite camera (1, 2) image are precisely located in terms of latitude and longitude on a celestial body, such as the earth, being imaged. A computer (60) on the earth generates models (40, 50) of the satellite's orbit and attitude, respectively. The orbit model (40) is generated from measurements of stars and landmarks taken by the camera (1, 2), and by range data. The orbit model (40) is an expression of the satellite's latitude and longitude at the subsatellite point, and of the altitude of the satellite, as a function of time, using as coefficients (K) the six Keplerian elements at epoch. The attitude model (50) is based upon star measurements taken by each camera (1, 2). The attitude model (50) is a set of expressions for the deviations in a set of mutually orthogonal reference optical axes (x, y, z) as a function of time, for each camera (1, 2). Measured data is fit into the models (40, 50) using a walking least squares fit algorithm. A transformation computer (66) transforms pixel coordinates as telemetered by the camera (1, 2) into earth latitude and longitude coordinates, using the orbit and attitude models (40, 50).

10 Claims, 6 Drawing Figures

IMAGE NAVIGATION SYSTEM FUNCTIONAL BLOCK DIAGRAM

FIG. 1 ORBIT DETERMINATION PARAMETERS

FIG. 6 TRANSFORMATION OF PIXELS TO LATITUDE & LONGITUDE

FIG.2
GOES IJKLM SATELLITE

FIG. 3 IMAGE NAVIGATION SYSTEM FUNCTIONAL BLOCK DIAGRAM

FIG. 4 TYPICAL MEASUREMENT FREQUENCIES

FIG. 5 COEFFICIENT K, A DETERMINATION

SATELLITE CAMERA IMAGE NAVIGATION

STATEMENT OF GOVERNMENTAL INTEREST

The invention described herein was made in the performance of work under NASA contract no. NAS5-29500 and is subject to the provisions of §305 of the National Aeronautics and Space Act of 1958 (72 Stat. 435; 42 USC 2457).

TECHNICAL FIELD

This invention pertains to the field of locating each pixel within a satellite camera image in terms of earth latitude and longitude.

BACKGROUND ART

The following three items give a general description of portions of the invention:

(1) D.W. Graul (one of the instant inventors), oral presentation accompanied by a posterboard display before the Environmental Research Institute of Michigan at its International Symposium on Remote Sensing of the Environment, Oct. 21, 1985; (2) "New GOES to Sharpen Severe Weather Tracking", *Aviation Week and Space Technology*, Dec. 23, 1985; and (3) A. Schwalb, "Envirosat-2000 Report; GOES-Next Overview", National Oceanic and Atmospheric Administration, September, 1985 (pages 25, 26, 28, 32, 35, 36).

P.D. Landecker, "Operational Spacecraft Attitude Determination Using Data from a Spinning Sensor", *Journal of Astronautical Sciences*, Vol. 32, No. 2, April–June 1984, pp. 189-198, discusses attitude determination of a spin stabilized satellite using star sensing.

Secondary references are U.S. Pat. Nos. 3,223,777; 3,676,581; 3,716,669; 3,769,710; 3,859,460; 3,952,151; 4,012,018; and 4,300,159.

DISCLOSURE OF INVENTION

The present invention comprises apparatus for achieving navigation of images taken by a camera (1, 2) on board a satellite. The satellite is orbiting the earth or other celestial body, and generates images of scenes on the body. Each image is divided into a plurality of pixels.

The camera (1, 2) takes and forwards measurements to modeling means (60), which generates in response thereto estimates (40, 50) of the satellite's orbit and attitude, respectively. Using information provided by the modeling means (60), transforming means (66) transforms pixel locations as determined by the camera (1, 2) into latitude and longitude with respect to the celestial body.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 2:
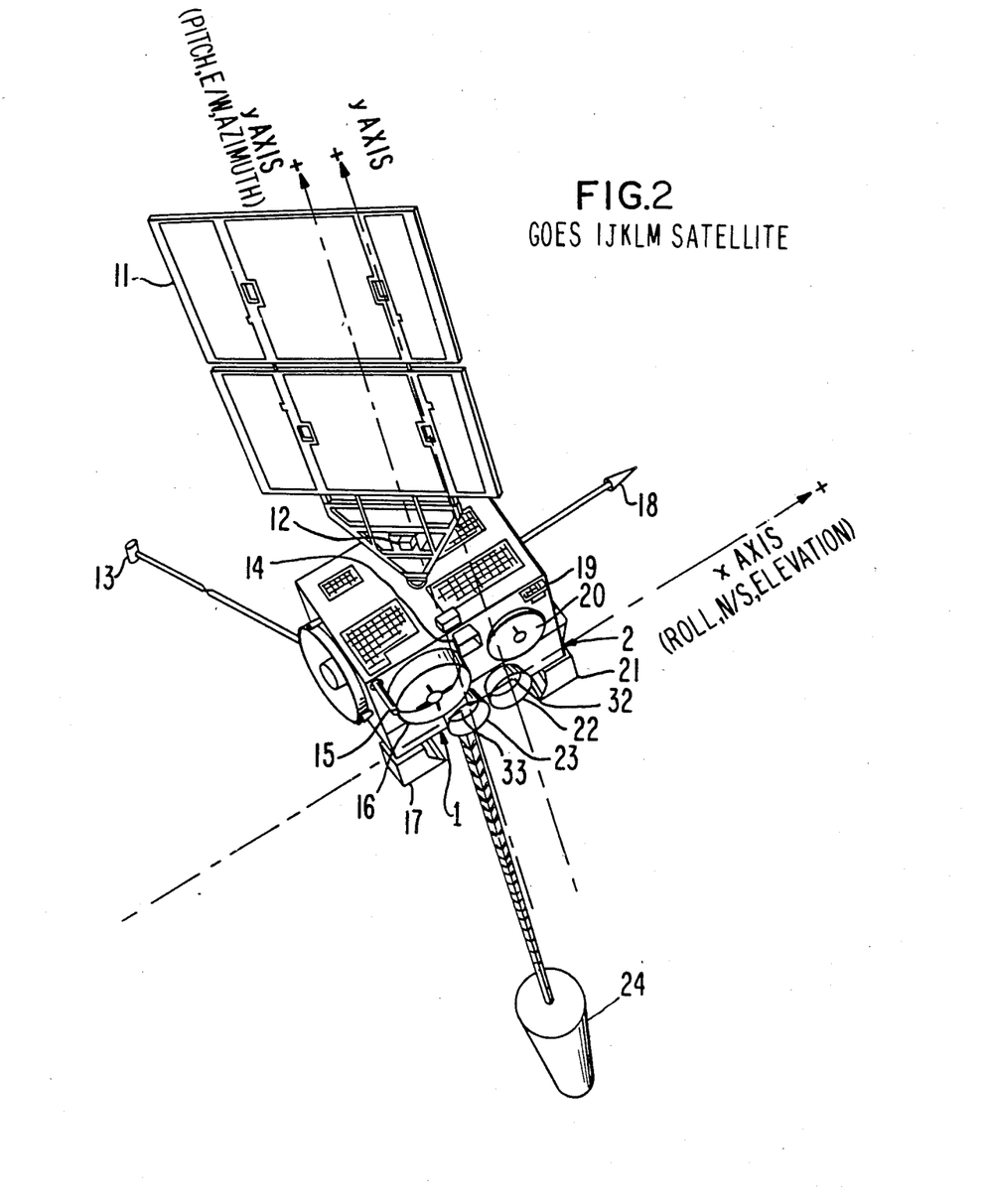
FIG. 2 is an elevational view of a GOES IJKLM satellite, a satellite which can advantageously employ the present invention.

Although the present invention has utility on any type of satellite, it will be particularly illustrated with respect to the satellite shown in FIG. 2: one of the three-axis stabilized geosynchronous GOES IJKLM meteorological satellites sponsored by NOAA (National Oceanic and Atmospheric Administration) and contracted for by NASA (National Aeronautics and Space Administration). The items shown on FIG. 2 include solar array 11, X-ray sensor 12, magnetometor 13, S-band transmit antenna 14, search and rescue antenna 15, UHF antenna 16, telemetry and command antenna 18, earth sensors 19, S-band receive antenna 20, solar sail 24, and two cameras: imager 1 and sounder 2. Imager 1 comprises cooler 17, aperture 23, and mirror 33. Sounder 2 comprises cooler 21, aperture 22, and mirror 32.

The mirrors 33, 32 are each mounted on a two-axis gimbal which selectively positions the mirror 33, 32 with respect to orthogonal x and y axes at a very fast step-scan rate of many successive positions per second. The ostensibly common x axis can also be referred to as the roll, north/south, or elevation axis. The y axis for each mirror 33, 32 can also be referred to as the pitch, east/west, or azimuth axis.

Imager 1 provides multispectral radiometric imaging of the earth's surface, which can be useful, for example, in measuring transverse cloud velocity. Imager 1 has five channels, four infrared and one visible; its two-axis gimbaled scanning mirror 33 sweeps an eight kilometer longitudinal swath along an east/west path on the earth, providing co-registered data of the viewed scene from all channels simultaneously. Position and size of the area scanned are controlled by command. The field of view of imager 1 is divided into a set of parallel scan lines each comprising many pixels. The pixel size (on the earth) is as small as 1 km by 1 km for one of the channels. A scan frame (comprising many scan lines) is that subset of the total possible field of view that is commanded to be scanned. The scan frame is scanned in 22 minutes for a whole earth scan, less for an area scan (portion of the earth). Passive radiation cooler 17 allows operation at lower temperature for increased sensitivity. Radiometric calibration is provided by periodic mirror 33 slews to space and to an internal blackbody target.

Sounder 2 measures moisture content and temperture within the earth's atmosphere on a pixel-by-pixel basis. Sounder 2 comprises a 19 channel (18 infrared and 1 visible) discrete filter wheel radiometer; its two-axis gimbaled scanning mirror 32 step-scans a 40 kilometer longitudinal swath across an east/west path in 10 kilometer increments. The nominal pixel size (on the earth) is 10 km by 10 km. A scan frame (comprising many scan lines) is scanned in an amount of time known as the correlation time. Passive radiation cooler 21 controls the filter wheel assembly temperature. This allows operation at lower temperature for increased sensitivity.

Radiometric calibration is provided by periodic mirror 32 slews to space and to an internal blackbody target.

Imager 1 and sounder 2 operate independently and simultaneously over a period of time known as an imaging or sounding "interval". The interval is specified to be at least 85 minutes and can be as much as 12 hours. During an interval, several frames are scanned and several images made. At the end of the interval, the spacecraft may enter the housekeeping mode, e.g., to fire thrusters for purposes of attitude control or momentum dumping.

The image navigation system described herein locates individual imager 1 and sounder 2 pixels within 1.7 km (36) at the subsatellite point, and within 5.0 km (36) at a 60° central earth angle. This pixel location accuracy is a factor of 3 and 6 better than requirements for the imager 1 and sounder 2, respectively, of the illustrated GOES IJKLM satellite. This accuracy is made possible because:

Each instrument 1, 2 is capable of utilizing a visible detector array to sense fourth magnitude stars.

Figure 3:
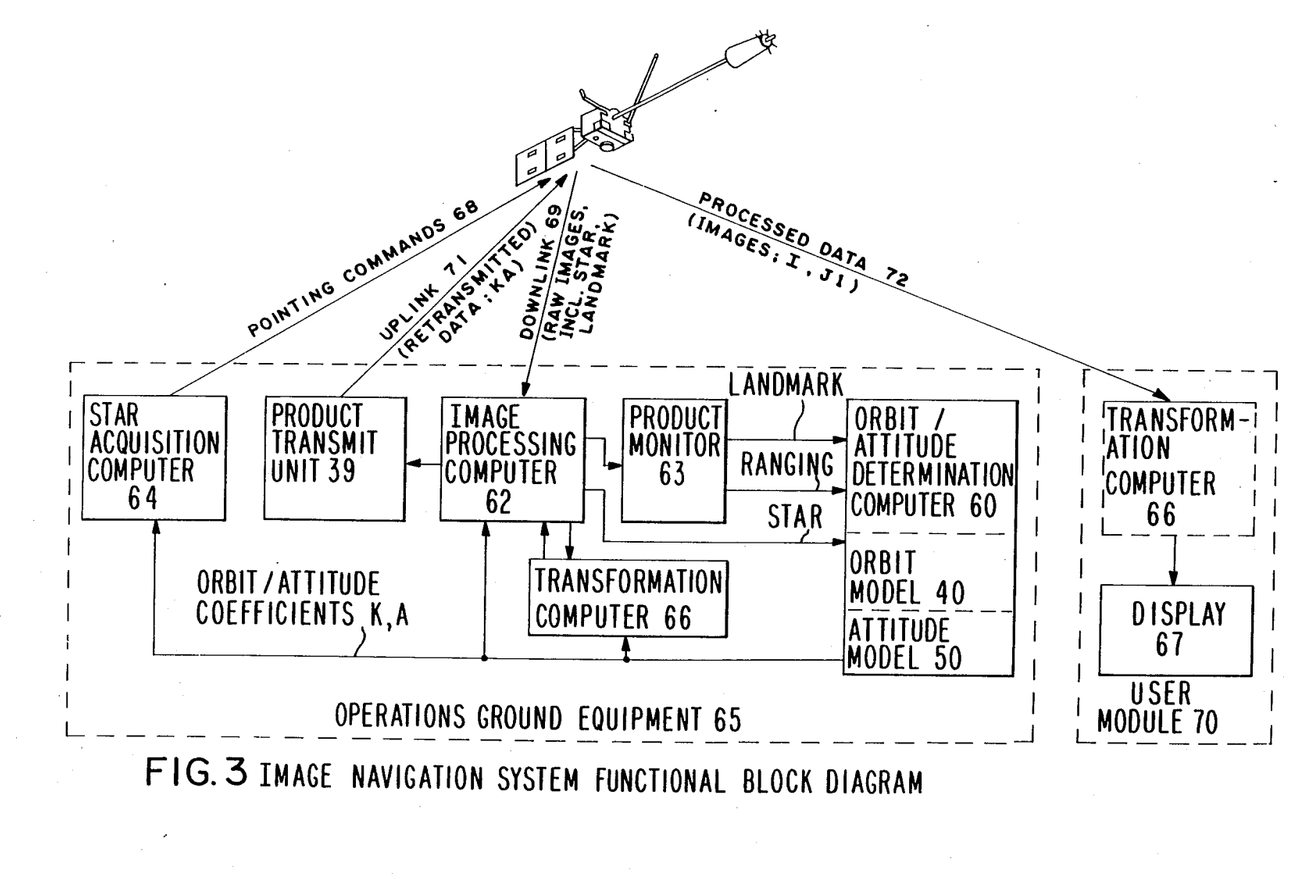
FIG. 3 is a functional block diagram of the major components of the present invention.

Only range data (altitude) combined with star and landmark observation data (angles) are used to generate the orbit model 40. Once the orbit is modeled, only star data (angles) are used to generate the attitude model 50.

The star and landmark data are taken through the instruments 1, 2 themselves; therefore, all long-term perturbation effects are "zeroed out," i.e., the effect is the same for each pixel in the earth image as it is in the star or landmark image. If a separate star tracker were used, its pointing position would not be identical to that of the instruments 1, 2, due to satellite mounting misalignments and variations caused by satellite thermal structural distortion in orbit.

Star and landmark measurements do not interfere with the operational imaging and sounding missions.

Star measurement is facilitated when using a three-axis stabilized satellite such as the GOES IJKLM illustrated herein, because of the quiet kinematic environment of such a satellite.

Figure 1:
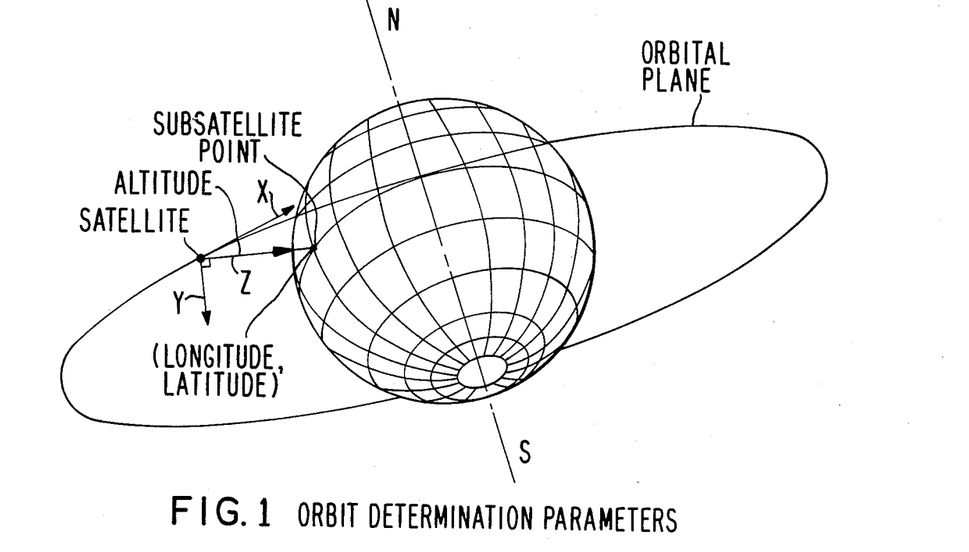
FIG. 1 is a sketch of the earth showing some of the orbital parameters used in describing the present invention.

Orbit determination is the process of determining the satellite's altitude, longitude, and latitude as a function of time. Longitude and latitude are measured at the subsatellite point, i.e., the point where the Z axis intersects the earth's surface. (See FIG. 1). The Z (yaw) axis connects the center of mass of the satellite with the center of mass of the earth. The Z axis lies in the orbital plane. The Y (pitch) axis passes through the center of mass of the satellite and is orthogonal to the orbital plane. The X (roll) axis is orthogonal to each of the Y and Z axes. The X axis lies along the transverse component of the satellite's velocity vector. The X axis would lie along the satellite's velocity vector if the orbit were perfectly circular. However, even for a satellite in geosynchronous orbit, the orbit is not precisely circular.

Attitude determination is the process of determining the orientation (roll, pitch, and yaw deviations) of a set of mutually orthogonal reference optical axes (x, y, z) relative to the reference orbital axes (X, Y, Z). The reference optical axes x, y, z are taken with respect to fixed portions of each of imager 1 and sounder 2, corresponding to null positions (as defined by earth commands) of their respective mirrors 33, 32. If no attitude errors exist, the x, y, z axes coincide with the X, Y, Z axes. Determination of the attitude model 50 requires computation of the long-term roll, pitch, and yaw angles of the reference optical axes x, y, z with respect to the reference orbital axes X, Y, Z, all with respect to time.

The three components of orbital position (latitude, longitude, altitude) are known as orbital parameters P and are determined by imager 1 star and landmark measurement, and range measurements using operations ground equipment (OGE) 65. The three components of the imager attitude $x_i$, $y_i$, $z_i$ are determined by imager 1 star measurements. A separate star measurement by sounder 2 determines the long term roll, pitch, and yaw angles of the sounder 2 reference optical axes $x_s$, $y_s$, $z_s$.

The present invention compensates for misalignments, drift, aging, and any other long-term attitude variations without individual measurements of these effects, and is relatively insensitive to the magnitude of these effects.

The angle between star and landmark is affected only by changes in the spacecraft's orbital position. Variations in attitude do not cause any change. Therefore, the orbit data is effectively decoupled from the attitude data, and orbital model 40 and attitude model 50 can be determined separately.

Once orbit model 40 is determined, a sequence of at least two star measurements leads to determination of the attitude coefficients A.

In actual mission operation, a slight degree of coupling between attitude and orbit data will occur because of the small attitude change during the brief time (typically about half an hour) between star measurements. This coupling can be compensated for by combining the orbit and attitude determination process into a single large orbital/attitude model 40, 50. This model 40, 50 can then have its coefficients K, A solved for simultaneously, using, e.g., a known recursive filter or an algorithm known as the "walking least squares fit".

Orbital model 40 gives the orbital parameters P (satellite altitude, and its latitude and longitude at the subsatellite point) as a slowly moving function of time. The coefficients in orbital model 40 are the six Keplerian (orbital) elements at epoch. "Epoch" is the beginning of the orbit and attitude variation that is being modeled. The six Keplerian elements are the semi-major axis, eccentricity, inclination, argument at perigee, right ascension of the ascending node, and mean anomaly.

Orbit model 40 is based on NASA or other models of total acceleration on the satellite. The modeled total acceleration can include perturbing effects due to the asphericity of the geogravitational field up to twelfth order harmonics, gravitational attractions of the sun and moon, and direct solar radiation pressure on the satellite surface. A suitable orbit model is described in Lerch et al, "Gravity Model Improvement Using Geos 3 (GEM 9 and GEM 10)," *J. Geophysical Research*, Vol. 84, July 1979, pp. 3897–3916.

The motion of the earth's spin axis introduces errors into orbit determination 40 through precession, nutation, and polar wander. Precession and nutation are deterministic and are accounted for to 0.01 arcsecond in computer 60. Polar wander, on the other hand, is not completely predictable, but the magnitude of the effect (15 meters) is small enough to be ignored.

Attitude model 50 gives the movement of the x, y, z axes for each of the instruments 1, 2 as a slowly moving trigonometric (harmonic) function of time. For example:

$$x_s = A_0 = A_1 \sin wt + A_2 \cos wt + A_3 \sin 2wt + A_4 \cos 2wt$$

wt represents the angular position of the apparent daily motion of the sun about the satellite, where w is the angular velocity of the sun's apparent motion about the satellite and t is time. This expression includes terms up to the second harmonic, which is adequate for the illustrated embodiment. However, fewer or more harmonic terms could be inserted into the model, depending upon the desired degree of accuracy. Constant terms $A_o$, if present, represent fixed mechanical alignment biases. Amplitudes of the harmonics (given by the coefficients $A_1$ through $A_4$) represent daily variations due to solar radiation pressure effects on yaw, structural thermal distortions, and earth sensor 19 thermal drift. All these perturbations are periodic and result from the sun's apparent daily motion about the satellite. A harmonic series is used for model 50 because these perturbations are periodic. The trigonometric model is simple and is based on physical reality. The sources of daily variation are not determined separately; rather, their collective effects are characterized by the coefficients A. The coefficients A vary from day to day, representing seasonal changes in the yaw, thermal distortion, and earth sensor 19 drift, due to changes in sun declination.

The number of coefficients A of the illustrated harmonic series is five for each attitude component (x, y, z) of each of imager 1 and sounder 2, for a total of 30 coefficients. Coefficients A can be obtained together with, or independently from, the six orbital elements at epoch (K), and continuously updated afterwards. Analysis shows that the accuracy of model 50 is about ±18 microradians (3 sigma) in either E-W or N-S directions.

Attitude model 50 is also used in case of satellite position change. The arguments of the trigonometric series in model 50 are expressed in terms of the sun right ascension relative to the satellite. The model is therefore independent of the satellite longitude. A separate model is not required during the drift phase between operational positions.

At certain times (e.g., within the first 2 hours after eclipse or stationkeeping), the trigonometric series model 50 does not represent the actual satellite attitude behavior, due to different thermal effects. In this case, secondary attitude models are used for attitude determination. Following stationkeeping, the secondary model comprises a quadratic series in time. Following eclipse, the secondary model comprises an exponential function.

FIG. 3 shows the orbit/attitude determination measurement processing.

Image processing computer 62 within OGE (operations ground equipment) 65 receives over downlink 69 the raw images from the cameras 1, 2. These raw images include normal operations images, landmark images from imager 1, and star images from both instruments 1, 2. Computer 62 processes the normal operations images for retransmission to one or more earth-based user modules 70 via product transmit unit 39, uplink 71, and downlink(s) 72. Landmark data are processed offline using product monitor (PM) 63 and disks, to generate landmark pixel coordinates, and are inputted to orbit-/attitude determination computer 60 by PM 63 as they become available. Star sightings are processed online by computer 62 (to generate star pixel coordinates) and inputted to computer 60 in real time.

Ranging data is processed off line by PM 63. The processed ranging data are inputted to computer 60 by PM 63 as they become available.

Computer 60 compares the star, landmark, and range measurements with values predicted by the models 40, 50. Coefficients A and K are updated on the basis of this comparison.

Figure 5:
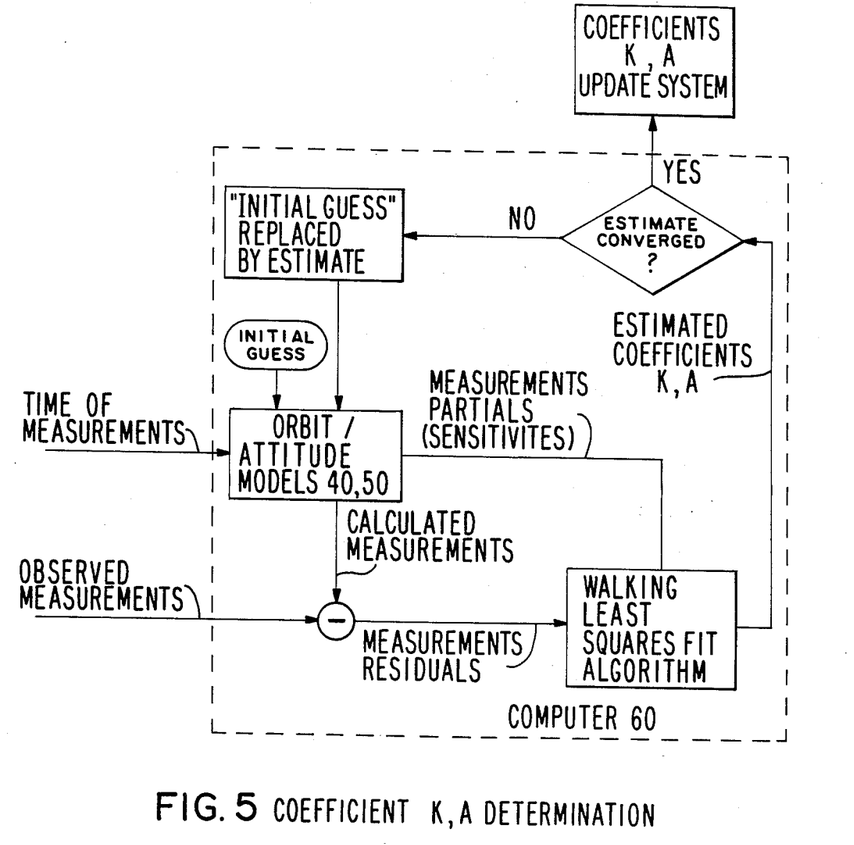
FIG. 5 is a functional block diagram showing how the walking least squares fit algorithm is used to generate orbital and attitude coefficients K, A.

The walking least squares fit algorithm used by computer 60 is described in FIG. 5. This provides continuous end-to-end-calibration of the image navigation system, and self-compensation of aging, thermal effects, and all other long-term effects. The illustrated walking least-squares fitting needs to be done but weekly to update the orbital coefficients K, and every half hour to update the attitude coefficients A. Coefficients A can be fitted separately and independently from coefficients K, or, alternatively, both sets of coefficients A, K can be fitted together.

The measurements sent by computer 62 and PM 63 to computer 60 include pixel coordinates of the stars and landmarks, plus range data, plus the times these measurements were taken. An initial guess of the coefficients K and A is used for initialization of models 40, 50, based upon ranging data obtained during the transfer orbit. Based upon this initial guess, models 40, 50 are solved for the "measurements", i.e., the orbital parameters P and the positions of the x, y, z reference optical axes for each of imager 1 and sounder 2. These calculated measurements are compared with the observed measurements as provided by computer 62 and PM 63. The differences between the calculated and observed measurements, known as "measurement residuals", are subject to a walking least squares fit algorithm, which also uses as an input the partial derivatives of the calculated measurements with respect to the coefficients K, A. The result is a set of estimated coefficients K, A.

If the last preselected several of these sets of estimated coefficients K, A have been converging, the process is considered to have been successful, and these estimated coefficients K, A become the coefficients K, A outputted by computer 60 to star acquisition computer 64, product transmit unit 39, and transformation computer 66. If, on the other hand, the estimated coefficients K, A have not been converging, another iteration of the walking least squares fit algorithm is entered into, by means of the initial guess of coefficients K, A being replaced by the latest iteration of the estimated coefficients K, A.

Coefficients K, A are incorporated in the documentation of the imaging and sounding data that are sent to the user modules 70, via product transmit unit 39, uplink 71, and one processed data link 72 for each user module 70. Uplink 71 and each processed data link 72 also contain earth latitude and longitude coordinates of preselected image pixels of imager 1, and earth latitude and longitude of all pixels of sounder 2. Links 71 and 72 also contain the locations of the first pixel in each imager 1 scan line; and grid points for given ground locations, given as pixel numbers, so that political boundary maps can be superimposed on the images displayed on user displays 67. Displays 67 may be hard copies, images on CRT's sent for distribution via commercial television stations, etc.

Figure 6:
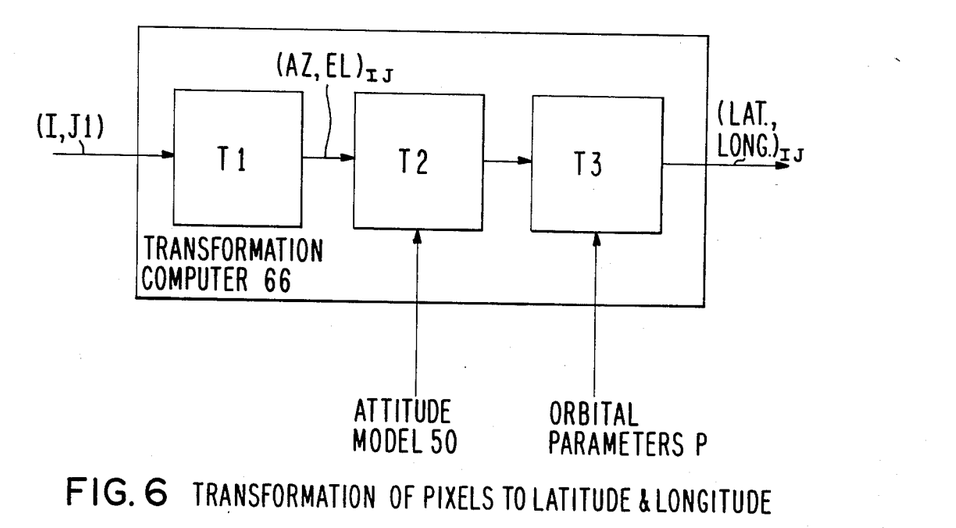
FIG. 6 is a functional block diagram showing the transformations ($T_1$, $T_2$, $T_3$) performed by transformation computer 66.

As illustrated in FIG. 6, transformation computer 66 within OGE 65 receives coordinates of each scan line (I) and first pixel (J1) within each scan line from computer 62. Computer 66 subjects these I, J1 pixel coordinates to three transformations: $T_1$, $T_2$, and $T_3$. $T_1$ transforms I, J1 to an AZ, EL for each pixel (angular position of the corresponding mirror 33, 32 with respect to its y and x axes, respectively) based on the known scanning rate characteristics of the mirror 33, 32. These known characteristics are stored within computer 66.

$T_2$ is an attitude transformation which transforms each AZ, EL into pixel angles as viewed from the orbit. $T_2$ uses as inputs the roll, pitch, and yaw deviations of the x, y, z axes from attitude model 50. The information to calculate these data is provided to computer 66 from computer 60, in the form of coefficients A. Finally, $T_3$ transforms the pixel angles as viewed from the orbit into earth latitude and longitude, using the orbital parameters P. The information to calculate these parameters P is found in orbital coefficients K provided to computer 66 by computer 60.

An optional transformation computer 66 is present in each user module 70, for purposes of calculating earth latitude and longitude for all of the pixels from imager 1, and not just the preselected ones of said pixels for which transformation computer 66 within OGE 65 calculates said earth latitude and longitude. Transformation computer 66 within module 70 operates identically to transformation computer 66 within OGE 65, except that all its input information (I, J1, K, A) is provided by processed data downlink 72.

Range can be measured with any uplink and downlink. For GOES IJKLM, we use uplink 71 and a downlink 72 sent to PM 63 as if it were a user. PM 63 measures the elapsed time between the occurrence of a frame header synchronization pattern in the downlink 72 versus the uplink 71. After subtracting the known fixed satellite and ground system delays, the remaining time is the two-way transient time, which is directly proportional to range. The proportionality constant is the speed of light, which is known. Therefore, the range is known from the transient time. PM 63 sends the ranging information to computer 60 in an offline fashion.

The periodic range measurements are accomplished within OGE 65 without any required operator intervention. The ranging process has no effect on any other operations beyond requiring active data links 71, 72. A slight ranging error is based on the fact that the retransmitted communication links 71, 72 are digital, and the transient time can be determined only to within a fraction of one bit.

Landmark identification is performed at PM 63. Imager 1 observations of earth-based landmarks (such as San Francisco Bay or Baja California) are telemetered to computer 62 via downlink 69, retrieved offline from a computer disk associated with PM 63, and displayed on a CRT associated with PM 63. These images are of normal operations views that happen to include landmarks. The operator then positions a cursor over the landmark. PM 63 compares the coordinates of the landmark as sent by imager 1 with the landmark's "known" geographic location, and passes this information to computer 60 to update orbit estimate 40. Of course, there is a slight error in the degree to which the ground user "knows", and is therefore able to program PM 63 with, the precise coordinates of the landmark.

When PM 63 detects that imager 1 is scanning an area containing an identifiable landmark, as determined by comparing image data coordinates with landmark area coordinates stored in its data base, PM 63 stores the data from a small area surrounding the landmark onto a magnetic disk for subsequent landmark identification. Identification of each landmark can be accomplished one at a time as the data are ingested, or, alternatively, identification of several landmarks can be done sequentially after the whole day's data have been stored, as suits the convenience of the operator.

Figure 4:
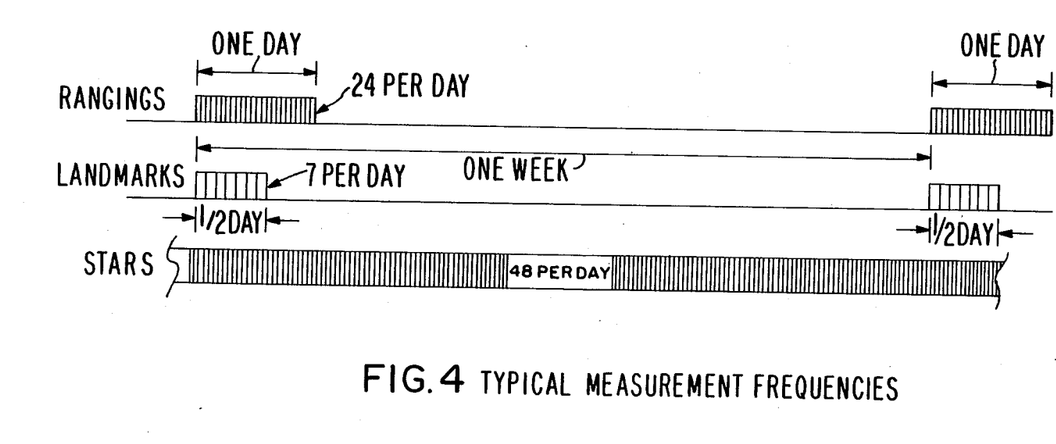
FIG. 4 is a chart showing suitable frequencies for ranging, landmark, and star measurements used in the present invention.

FIG. 4 shows typical range, landmark, and star measurement frequency.

To determine the minimum number of required landmarks, an orbit and attitude determination error analysis was performed, based on the least-squares estimation technique. The estimation used measurement data gathered over a 24-hour period according to the following schedule:

A star observation every half-hour (48 observations).
A range measurement every hour (24 measurements).
Equally spaced landmark observations during the first 12 hours.

This analysis is very conservative, since the subsequent 7-day period was modeled with no additional measurements of any type, whereas in practice, range measurements and star observations would be continued for the entire period following the last landmark observation.

We determined that taking as few as two landmark observations, spaced approximately 12 hours apart, ensures that at least 2 days will elapse before additional landmark observations are required. The 12-hour landmark-observing spacing is not critical, and can vary by at least an hour without any significant effect on navigation and registration performance. (For further information on image registration, see the U.S. patent application Ser. No. 06/860,373 entitled "Spacecraft Camera Image Registration" filed concurrently herewith and having the same assignee.) The two sightings do not need to be of the same landmark, allowing selection of landmarks that are in daylight at different local satellite times.

We also determined that taking seven landmark observations in the 12-hour period extends the period during which no landmark observations are required to 7 days. This affords considerable flexibility in scheduling landmark observations so as to have minimum impact on normal scanning operations.

The orbit estimation process uses identification of landmarks in the visible band of imager 1 data. Considerable flexibility is available in scheduling the gathering of landmark identification data and in scheduling the actual process of identifying the landmarks, since the purpose of these data is determination of the orbit parameters P, which change very slowly in time in a predictable manner.

Since they are used only to determine the orbit parameters P, landmark observations are required much less frequently than star observations. In general, the more landmark observations that are taken in the 12-hour period, the more accurately the orbit will be determined, which, in turn, results in a longer time before landmark observations are again required. Waiting an extra day to obtain landmark data is acceptable, since the orbit errors increase gradually, with an initially imperceptible and slowly increasing degradation of navigation accuracy.

In addition to scheduling flexibility, the small amount of time required to gather landmark data helps to ensure minimum impact on normal imaging operations. A scan of a small 300 km by 300 km area containing a landmark can easily be inserted into the normal operations scenario, as it requires less than 10 seconds to complete.

The orbit/attitude modeling process accepts any landmark, and is not constrained by a specific landmark. In case a targeted landmark has a cloud cover, another landmark can be used. The chance that all available landmarks are covered by clouds seven days a week is remote.

A star measurement starts by a pointing command 68 issued by star acquisition computer 64. In the case of a star measurement taken by imager 1, that instrument will finish its current scan line before it executes the command 68. At the end of the scan line, the imager mirror 33 is slewed to point the center of the imager's 8-detector array to the east of the predicted star location, in order to intercept the eastward moving star. The eight detector elements are operable in the visible portion of the spectrum and are aligned in a north-south (elevation) direction. The eight detectors encompass a total elevation angle of 224 microradians (28 microradians per detector). The apparent motion of the star through the detector from west to east results from the pitch motion of the satellite as it maintains its earth pointing attitude while orbiting the earth. The star, moving at the rate of 3 pixels per second (0.25°/min), crosses the stationary detector array in 0.3 second.

While mirror 33 is stationary, the detector element outputs are sampled and sent to the earth via downlink 69 to image processing computer 62. Special steering bits are inserted into the downlink 69 format as the mirror 33 slew to the star location begins, so that computer 62 can set up appropriate star data routing and processing paths. Stars are identified within computer 62 by comparing observed views with a preselected map of stars residing within computer 62.

After measurement, mirror 33 is slewed back to start the next scan line from where it began. The star sensing maneuver lasts approximately 10 seconds.

Uncertainty in the absolute pointing direction of the detector array line of sight results from uncertainties in the camera 1 attitude about the reference optical axes x, y, z, and from small variations in camera 1 scan control repeatability. During normal on-orbit mode, the total uncertainty in the elevation (N-S) direction from all these sources is 29 microradians. Since the detector array spans a total elevation angle of 224 microradians, one positioning of mirror 33 is sufficient to ensure that the star will be detected. Uncertainty in the azimuth (E-W) direction is of the same order, and is accommodated by positioning the line of sight eastward in azimuth from the star location by an amount sufficient to allow for the azimuth uncertainty, then holding mirror 33 stationary while the star passes through the detector array field of view.

Separate, substantially identical, star-sensing capability is provided in sounder 2. This enables separate and independent sounder 2 attitude determination, and therefore eliminates the need for accurate alignment of sounder 2 relative to imager 1. (Misalignments between imager 1 and sounder 2 can be caused by thermal distortions.) Star-sensing capability in these instruments 1, 2 has the additional advantage of eliminating the need for accurate alignment of each instrument 1, 2 relative to earth sensors 19.

The total landmark and star location errors are independently random. The effect of these errors on pixel location is highly attenuated because of the large number of measurements used in the orbit/attitude determinations 40, 50. The attenuation factor is proportional to the square root of the number of observations.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, computers 60, 62, 64, and 66 may be part of one large computer. Star sensing and landmark imaging could be performed at wavelengths other than visible.

What is claimed is:

1. Apparatus for locating any pixel within a satellite camera image in terms of latitude and longitude, said apparatus comprising:
    a satellite in orbit around a celestial body;
    an imaging camera on board the satellite for taking images of scenes on the celestial body, wherein each image is divided into a plurality of pixels;
    modeling means which uses measurements taken by the cameras to generate an estimate of the satellite's orbit and an estimate of the camera's attitude; and
    coupled to said modeling means, means for transforming pixel locations as announced by the camera into latitude and longitude coordinates with respect to the celestial body.

2. The apparatus of claim 1 wherein
    the modeling means is located external to the satellite;
    the estimates of the satellite's orbit and attitude are slowly moving functions of time; and
    the orbit and attitude estimates are periodically updated by measurements taken by the camera and telemetered to the modeling means.

3. The apparatus of claim 1 wherein the orbit estimate is first generated, and then the attitude estimate is generated, said attitude estimate being based solely on observations of stars made by the camera.

4. The apparatus of claim 1 wherein the modeling means simultaneously generates the estimates of the satellite orbit and camera attitude.

5. The apparatus of claim 1 further comprising a second instrument, wherein the modeling means generates an estimate of the satellite's orbit, an estimate of the camera's attitude, and an estimate of the second instrument's attitude.

6. The apparatus of claim 1 wherein the attitude estimate is an expression of the motion of a set of mutually orthogonal reference axes as a trigonometric series in time.

7. The apparatus of claim 1
    wherein the orbit estimate is an expression of the satellite's latitude and longitude at the subsatellite point, and of the altitude of the satellite, as a function of time, comprising coefficients which are the six Keplerian elements at epoch;
    wherein the Keplerian elements at epoch are estimated using a walking least squares fit based upon star and celestial body landmark location data measured by the camera and telemetered to the modeling means.

8. The apparatus of claim 1 wherein the transforming means performs, in the following order, the following three transformations:
    a mirror transformation transforming pixel coordinates determined by the camera into pointing coordinates of a scanning mirror associated with the camera;
    an attitude transformation transforming the pointing coordinates into orbit-based pointing angles, said attitude transformation taking into account the attitude estimate; and an orbital transformation transforming the orbit-based pointing angles into latitude and longitude on said celestial body, said orbital transformation taking into account said orbit estimate.

9. Apparatus of claim 1 wherein the estimate of the satellite's orbit is generated from measurements of stars and celestial body landmarks taken by the camera, and by measurements of the satellite's altitude above the celestial body.

10. The apparatus of claim 9 wherein the celestial body is the earth, the modeling means and transforming means are located on the earth, and the measurements of the satellite's altitude are obtained by sending a signal from the earth to the satellite and back to the earth.

* * * * *